(12) United States Patent
Sommer, Jr. et al.

(10) Patent No.: US 7,558,370 B2
(45) Date of Patent: Jul. 7, 2009

(54) METHOD AND APPARATUS FOR IMPROVING IDENTIFICATION AND CONTROL OF ARTICLES PASSING THROUGH A SCANNING SYSTEM

(76) Inventors: Edward J. Sommer, Jr., 566 Mainstream Dr., Suite 300, Nashville, TN (US) 37228-1202; Richard E. Hill, 566 Mainstream Dr., Suite 300, Nashville, TN (US) 37228-1202

( * ) Notice: Subject to any disclaimer, the term of this patent is extended or adjusted under 35 U.S.C. 154(b) by 221 days.

(21) Appl. No.: 11/568,801

(22) PCT Filed: Nov. 7, 2006

(86) PCT No.: PCT/US2006/060605
§ 371 (c)(1),
(2), (4) Date: Nov. 7, 2006

(87) PCT Pub. No.: WO2007/089362
PCT Pub. Date: Aug. 9, 2007

(65) Prior Publication Data
US 2008/0260096 A1   Oct. 23, 2008

Related U.S. Application Data

(60) Provisional application No. 60/734,057, filed on Nov. 7, 2005.

(51) Int. Cl.
*G01N 23/04* (2006.01)
(52) U.S. Cl. .......................................... 378/57; 378/63
(58) Field of Classification Search .................. 378/20, 378/57, 63, 98.5, 114–117, 166, 206
See application file for complete search history.

(56) References Cited

U.S. PATENT DOCUMENTS

| | | | |
|---|---|---|---|
| 4,430,568 A | | 2/1984 | Yoshida et al. |
| 5,367,552 A | * | 11/1994 | Peschmann .................. 378/57 |
| 5,539,798 A | | 7/1996 | Asahina et al. |
| 5,600,303 A | | 2/1997 | Husseiny et al. |
| 5,600,700 A | | 2/1997 | Krug et al. |
| 6,229,873 B1 | * | 5/2001 | Bani-Hashemi et al. ....... 378/63 |

* cited by examiner

*Primary Examiner*—Edward J Glick
*Assistant Examiner*—Thomas R Artman
(74) *Attorney, Agent, or Firm*—Wyatt, Tarrant & Combs, LLP; H. Roy Berkenstock

(57) ABSTRACT

An article sensing and tracking system and computer system integrated and connected to present on a monitor screen, or screens, visual x-ray and photographic images of articles that are being passed through a scanner and visual indication of the physical location of the displayed articles within the system, enabling security personnel viewing a monitor screen to accurately track and maintain custody of the articles, until cleared, through examination of x-ray data and other information relating to the articles.

29 Claims, 16 Drawing Sheets

METHOD AND APPARATUS FOR IMPROVING IDENTIFICATION AND CONTROL OF ARTICLES PASSING THROUGH A SCANNING SYSTEM

CROSS REFERENCE TO RELATED APPLICATIONS

This application claims priority of Provisional Application Ser. No. 60/734,057 filed Nov. 7, 2005, which is incorporated by reference herein.

STATEMENT REGARDING FEDERALLY SPONSORED RESEARCH OR DEVELOPMENT

Development of this technology has been assisted with funding from NSF SBIR Award DMI-0422071.

BACKGROUND OF THE INVENTION

The aviation security industry has a clear and pressing need for improvements in security effectiveness while reducing costs of operations. There has been a vastly increased emphasis on improving national security since the terrorist attacks of Sep. 11, 2001. Current article screening methods at entry points to secure areas in airports and other security sensitive installations are essentially manual systems that take a little advantage of today's computerized technologies. Typically, situated at the entry to an airport concourse, for instance, is a security checkpoint station having x-ray scanners for inspection of carried articles. An x-ray image inspector (screener) who examines the x-ray images of articles passing through a scanner is stationed at each scanner. The screener regulates the motion of articles through the scanner by cycling on and off the conveyor belt that transports articles through the scanner. In a typical sequence the screener will energize the conveyor belt and transport an article into the scanner and through the scanning zone within the scanner. A typical sized article will remain within the confines of the scanner but near the exit from the scanner as it clears the scanning zone. An x-ray image is generated and displayed on a monitor screen for the screener to examine. The screener normally will then de-energize the conveyor belt and hold the article within the confines of the scanner while examining the x-ray image. Holding the article in the confines of the scanner allows the screener to maintain physical control over the article until the article is cleared through examination of its x-ray image.

If the screener does not see any suspect items in the x-ray image, then the screener will energize the conveyor belt and pass the article out of the scanner making it accessible to passengers so that it can be retrieved and carried away from the security checkpoint by its associated passenger. If a screener sees a suspect item in an x-ray image of an article, the screener typically suspends image scanning and inspection and orally alerts search personnel stationed in the vicinity of the x-ray machine conveyor to remove the article in question from the scanner to search for the object. However, it is possible for the screener to lose control of the article and not know where it is located within the system. For example, a screener can forget to de-energize the conveyor belt and inadvertently allow an article to pass through the scanning zone and out of the scanner, unbeknown to the screener, while the screener examines the stationary x-ray image of the article on the scanner monitor screen. Once the article is out of the scanner it can be accessed by passengers and picked up and carried away before its x-ray image has been cleared. In such cases the Transportation Security Administration (TSA) security personnel at an airport have been known to close the airport concourse where the article was not properly screened, empty the concourse of passengers and their carried articles, and re-screen all passengers and their carried articles resulting in a major delay in airplane departures from the airport thereby adversely affecting flight operations throughout the airport system. Such unfortunate events are not infrequent and are very disruptive and costly.

As an article is transported through an x-ray scanner, an x-ray image of the article is generated and displayed on a visual monitor in order for a screener to examine the x-ray image for potential prohibited items, contraband, or the like. A typical scanner will scroll its x-ray image onto the monitor screen as an article moves through the scanning zone within the scanner and the x-ray image is generated responsive to electronic signals received from detectors within the scanning zone. As the article clears the scanning zone the scanner system by design may then freeze the x-ray image on the monitor screen so that image inspection can take place because visual image inspection is difficult to perform on a moving image and the screener must have adequate time to examine the x-ray image before it leaves the screen. In this case the x-ray image stays motionless on the monitor screen, regardless of conveyor belt motion, until a subsequent article enters the scanning zone and a new x-ray image is generated and scrolled onto the monitor screen. Typical scanners are designed such that the movement of x-ray images onto, across, and off the monitor screen is related to the rate of introduction of articles to be scanned into the scanner and not to the motion of the scanner transport conveyor through the scanner. This design feature at times can be confusing to the screener in that there is a natural tendency for a person, such as a screener, to relate the motion of the x-ray image scrolling on the screen to the transport motion through the scanner of the article being x-rayed. Thus, when the scanner freezes the motion of the x-ray image on the screen a screener can subconsciously, and erroneously, interpret this as the transport conveyor stopping its motion. The conveyor belt motion may then continue while the screener thinks it has stopped and convey the article out of the scanner while the article's x-ray image is being inspected.

For example, assume a case where a first article is transported on the conveyor into the scanner zone at a typical conveyor speed of 9 inches/sec. A second article is not placed onto the conveyor belt at the input to the scanner by another passenger until 20 seconds later. As the first article passes through the scanning zone within the scanner, an x-ray image of it scrolls onto the monitor screen. As the article clears the scanning zone, the image will stop scrolling across the screen and remain motionless until the next (second) article enters the scanning zone. The screener, who normally would turn off the conveyor belt, forgets in this example to turn it off and the motionless x-ray image on the screen lulls the screener into thinking the conveyor belt is stopped. The screener, seeing a potential suspect item within the x-ray image, is closely examining the x-ray image when suddenly it scrolls across the screen as the second article moves into the scanner zone. The screener then realizes that the belt was not stopped while the screener was examining the x-ray image of the first article during which time the first article has moved 15 ft out of the scanner into the passenger pickup area. In trying to find the first article with the suspect item somewhere in the passenger pickup area the screener, not knowing what the article physically looks like, realizes that a passenger may have already retrieved it and left the area and is somewhere in the concourse. The TSA then may clear the concourse of all passengers and their carried articles and all must be re-screened.

What is needed to help prevent such mistakes is a system that informs security personnel of the physical location of articles whose x-ray images are displayed on the scanner monitor screen, that alerts the screener and/or other security personnel when an article is moving out of the confines of the scanner, and that can present photographs of the articles correlated with their x-ray images on the monitor screen to help in article identification. The present invention provides these capabilities.

FIELD OF THE INVENTION

The inventive scanner data and conveyed article sensing, tracking, and data handling system of the present invention provides information to security personnel on the physical location of articles passing through a scanner thereby helping to maintain physical control of articles until they are cleared through inspection of their x-ray images. The system also provides to security personnel photographs of articles passing through the scanner correlated with their x-ray images to help in article physical identification. The system allows for increased physical control by security personnel of articles passed through security checkpoints by providing information on their locations within the scanner as well as the visual appearance thereby reducing errors and reducing costs of errors at such security checkpoints for clearing people and their carried articles for entry into secure areas at installations such as airports, federal buildings, seaports, border crossings, and other sensitive installations.

Typical security checkpoint x-ray scanning systems, such as the L-3, Rapiscan, or Heimann series of scanners, are designed to produce an x-ray image of an article as it is conveyed through the scanning region. The x-ray image resulting from a scan is displayed on the scanner's inspection station visual monitor until replaced by the next x-ray image resulting from the next scan. Consequently, in today's machines after each scan of an article the scanning process is normally halted to allow a screener the opportunity and time to inspect the x-ray image since the image will be replaced by the next scan. Physical control of articles can be compromised if the screener loses track of location of articles within the scanning system, as can occur for example when the conveyor belt transporting articles through the scanner is not stopped while examining an x-ray image.

The present invention uses an article tracking sensor system integrated with software and a computer system to present on a monitor screen visual information on the physical location of articles that are being passed through the scanner so that security personnel can accurately maintain custody of articles until cleared through examination of their x-ray images. The present invention also provides for display of photographs of articles passing through the scanner correlated with their x-ray images displayed on a monitor screen to aid in matching physical articles with their x-ray images to help in visual identification of articles passing through the scanner. The present invention also provides notification upon selection of an article to be further inspected or searched that the conveyor belt needs to be stopped if it is motion. The present invention also provides for visual and/or audio alarm signals that indicate to checkpoint security personnel when an article selected for search has inadvertently moved out of the secure region of the scanner system and has become accessible to the public.

SUMMARY OF THE INVENTION

The present invention provides method and means to track and visually report the location and physical appearance of articles associated with x-ray images displayed on a scanner monitor screen as the articles are conveyed through a scanner system in order to assist in identifying and maintaining physical control of the conveyed articles as they are scanned and their x-ray images inspected for suspect items. The inventive scanner data and conveyed article sensing, tracking, and data handling system of the present invention reduces errors and operating costs for clearing people and their carried articles for entry into secure areas at installations such as airports, federal buildings, seaports, border crossings, and other sensitive installations. Included among the features of the new system are:

Method and means to photograph or video articles conveyed through a scanner and associate the photographs or video with their corresponding conveyed articles and with their corresponding x-ray images and display them for visual inspection on one or more monitor screens.

Method and means to automatically track locations of articles conveyed through a scanner and visually indicate such locations on one or more monitor screens.

Method and means to associate the location of a scanned article with its x-ray image and display a representation of such on one or more monitor screens.

Method and means to detect that an article undergoing inspection is passing into the cleared article area accessible to the passenger public.

Method and means to notify security personnel that an article undergoing inspection is passing into the cleared article area accessible to the passenger public Method and means to notify security personnel that an article selected for further inspection and search has inadvertently moved out of the secure region of the scanner system and is accessible to the public.

Method and means to display a scrollable series of photographs or scrollable video of an article in association with the scanned x-ray image of the article wherein the series displays incremental advancement of the article as it is conveyed into or through the scanning system.

DETAILED DESCRIPTIONS OF THE PREFERRED EMBODIMENTS

Figure 1:
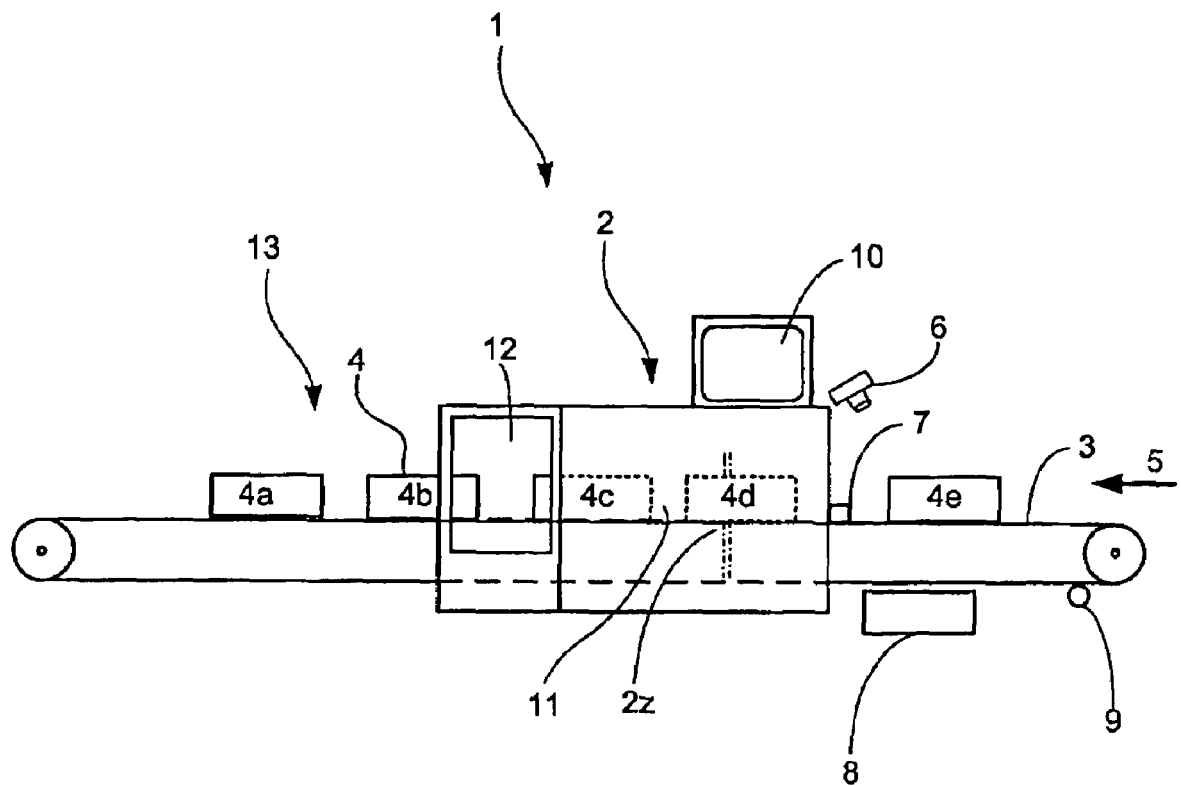
FIG. 1 is a schematic drawing illustrating portions of a typical scanning system, article flow through the system, and some article tracking and identification features of the invention.

Referring now to the drawings and FIG. 1 in particular, in the scanner system 1 illustrated multiple articles 4 (e.g. 4a, 4b, 4c, and 4d) are placed on conveyor mechanism 3, for instance the surface of a conveyor belt, moving in direction 5 and are processed serially, either singly or in groupings, through x-ray scanner 2. As articles 4 advance to the entrance of scanner 2 and into scanner 2 they are photographed by camera 6 and pass trigger system 7. Conveyor belt motion in this example is measured by conveyor belt position encoder 9. The photographs of articles 4 from camera 6 and the electronic signals from trigger system 7 and conveyor belt position encoder 9 are registered in computer 8 over electronic connections, which may be wired, or wireless. Software algorithms in computer 8 track the positions of articles 4 as they move through the system and maintain correlations between positions on the surface of conveyor 3 and positions of pixels displayed on monitor screen 10 in the display of x-ray images 17 of articles 4. As illustrated in this FIG. 1, as article 4d passes through x-ray scan zone 2z, x-ray image data of article 4d are generated. The x-ray image data are transferred from x-ray scanner 2 to computer system 8 over electronic connections, which may be wired, or wireless.

Computer system 8 may be internal to x-ray scanner 2 such that x-ray scanner 2 performs the functions described herein for computer system 8, external to x-ray scanner 2 as shown in FIG. 1, or a combination thereof. Computer system 8 may be a microprocessor, several microprocessors, a computer, a system of computers, a network of computers, or any combination thereof. Camera 6 may be located elsewhere in the system or may be a system of cameras delivering still photographs, video, or both. Conveyor belt position encoder 9 can be another belt tracking or article tracking system such as a video tracking system that uses camera 6 or other camera system or a radio frequency identification (RFID) tracking system or other tracking system.

Trigger system 7 can be a photocell system or another type proximity sensor system or article location sensor system such as an RFID tracking system or a video tracking system, machine vision system, or other such system to determine presence and position of articles 4 as they approach, enter into, or are within the scanner 2. Trigger system 7 may be located as shown in the FIG. 1 or placed elsewhere as required or as convenient.

Computer system 8 utilizes the x-ray image data to display x-ray images 17 of articles 4 on scanner display monitor 10 and/or other monitors and maintains correlations between positions on the surface of conveyor 3 or positions of articles 4 on the surface of conveyor 3 and positions of pixels displayed on monitor screen 10 in the display of x-ray images 17. Monitor screen 10 may be located at the x-ray scanner enclosure or may be located remote to the x-ray scanner and communicate to computer 8 over electronic connections either wired or wireless. Articles 4 pass from x-ray scan zone 2z through region 11 in the scanner 2 between x-ray scan zone 2z and article removal region 12 and then through article removal region 12 where they are accessible by security personnel for further inspection or searching but not generally accessible to others. Articles 4 which are not removed by security personnel at article removal region 12 pass out of the secure confines of regions 11 and 12 into cleared article access region 13 where the articles can be freely accessed and picked up by persons cleared into the secure area behind the checkpoint and carried away from the security checkpoint area.

It is helpful in maintaining control of articles 4 as they pass through scanner system 1 for security personnel to know at any given time the location within scanner system 1 of each articles 4 whose x-ray image 17 is displayed on display screen 10. The present invention provides this article location information visually through display of the information or representations of the information on the display screen 10 or other display screens along with display of x-ray images 17. For purposes of presenting location information, three regions are defined in which articles 4 can be located while there x-ray images 17 are displayed on display screen 10. These are scanning region 11, article removal region 12, and cleared article access region 13. More or fewer regions could be utilized and remain within the scope and spirit of the present invention. The present invention preferably uses a color code, shading code, pattern code, or other visually distinct representation to visually represent these regions on display screen 10 although other means to represent these regions, such as names, numbers, other codes, visual schematics, etc. could be easily used and remain within the scope and spirit of the present invention.

Figure 2:
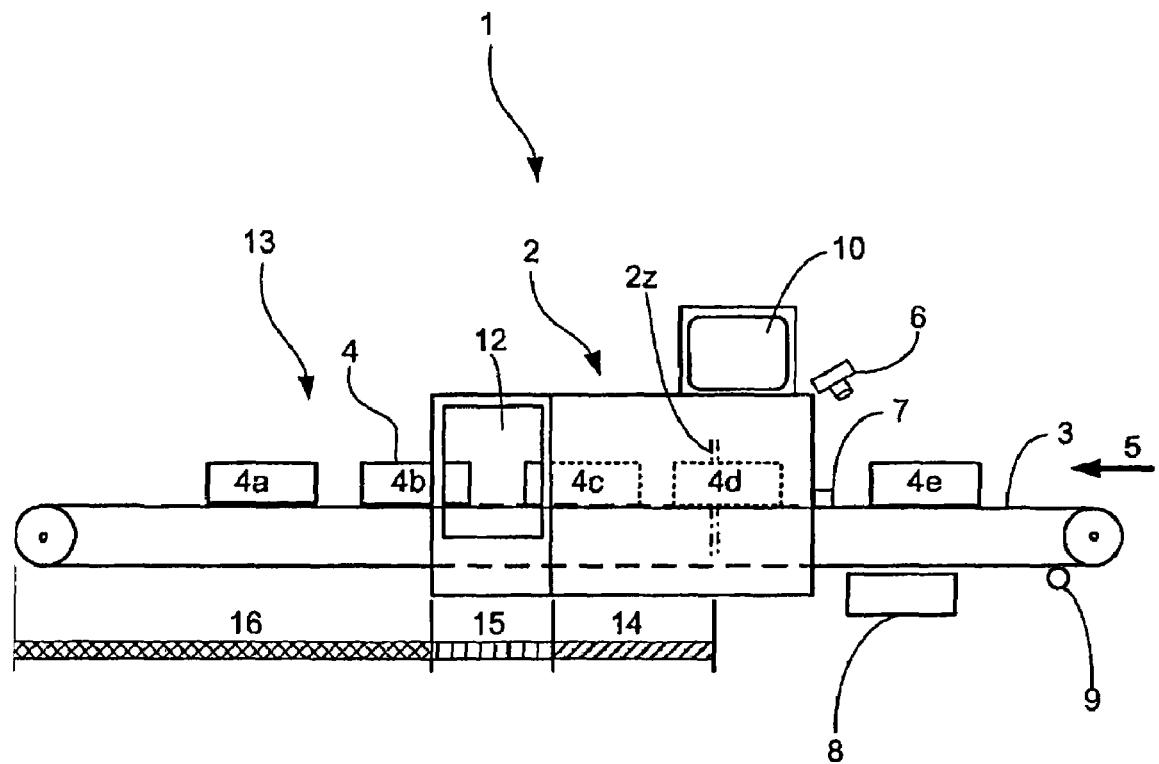
FIG. 2 is a schematic drawing illustrating portions of a typical scanning system, article flow through the system with articles at various locations within the system, some article tracking and identification features of the invention as illustrated in FIG. 1, and labels (colors or patterns or other visually distinctive indications) for display on a monitor screen of various potential article locations within the system.

Referring now to FIG. 2, color-pattern code 14 corresponds to scanning region 11 and is preferentially green, although another color, shading, pattern or other representation could be used; color-pattern code 15 corresponds to article removal region 12 and is preferentially yellow, although another color, shading, pattern or other representation could be used; and color-pattern code 16 corresponds to cleared article access region 13 and is preferentially red, although another color shading, pattern or other representation could be used.

Figure 3:
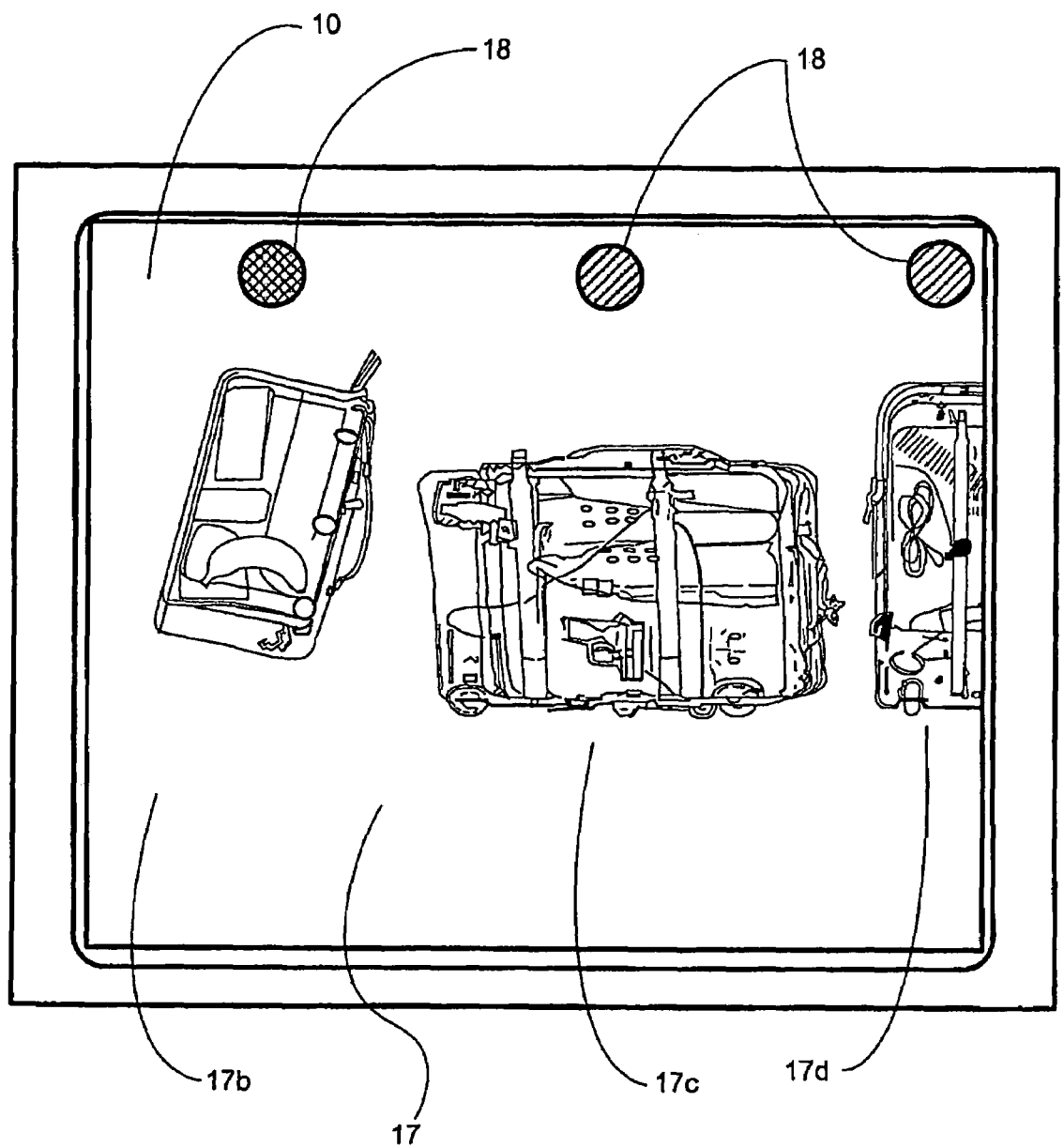
FIG. 3 is a drawing of a monitor screen display illustrating an example of visual feedback of the locations within the scanner system of the articles whose x-ray images are displayed on the monitor screen and whose physical locations within the system are as shown in FIG. 2.

The present invention visually presents location information for articles 4 on a display screen such as display screen 10 or other display screens. One example of such visual presentation utilizes color-pattern coded article location indicators 18 as shown in FIG. 3. In the FIG. 3 example each x-ray image 17 of an article 4 has a color coded, or shade coded, or pattern coded or similarly visually distinct coded article location indicator 18 positioned above it. Article location indicators 18 could also be positioned below x-ray images 17, on x-ray images 17, or other placement or displayed on another monitor. For this example, the shading of the article location indicators 18 indicates the locations within the system of the articles 4 corresponding to the x-ray images 17. For this example articles 4 are located as shown in FIG. 1 and FIG. 2 and the article location indicators 18 displayed above x-ray images 17 are shaded to indicate to the screener the physical region (11, 12, or 13) within scanner system 1 in which each corresponding article 4 is predominately located. In this example, if an article 4 overlaps two regions then the corresponding article location indicator 18 is shaded to represent the region containing the largest fraction of the overlapping article.

Other representations could be made also such as coloring article location indicators 18 to represent a region as soon as an article 4 begins entry into that region or, for instance, blinking article indicators 18 upon movement from one region into another. In some cases it may be advantageous to link article location indicators 18 with an external signal system, such as a light system or a visual display panel or audible signals, to inform security personnel in the checkpoint of the location of articles 4 as they pass through scanning system 1. It may be advantageous to link article location indicators 18 with a visual and or audible alarm system to alert security personnel when an article selected for search has inadvertently moved from a secure region of scanning system 1, such as article removal region 12, to a region accessible to the public, such as cleared article access area 13. In the example shown in FIG. 3, the article location indicator 18 above x-ray image 17b is dark shaded which informs the screener that article 4b (FIG. 2) corresponding to x-ray image 17b is located primarily in cleared article access region 13 (see shading codes FIG. 2) and is accessible to being retrieved by persons in the secure area behind the checkpoint. The article location indicator 18 above x-ray image 17c is medium shaded which indicates that article 4c (FIG. 2) corresponding to x-ray image 17c is located primarily in region 11 within the scanner and is inaccessible to being retrieved by persons in the secure area behind the checkpoint and possibly inaccessible to removal by security personnel at article removal region 12. The article location indicator 18 above x-ray image 17d is also medium shaded which indicates that article 4d (FIG. 2) corresponding to x-ray image 17d is also located primarily in region 11 within the scanner and is inaccessible to being retrieved by persons in the secure area behind the checkpoint and possibly inaccessible to removal by security personnel at article removal region 12.

Figure 4:
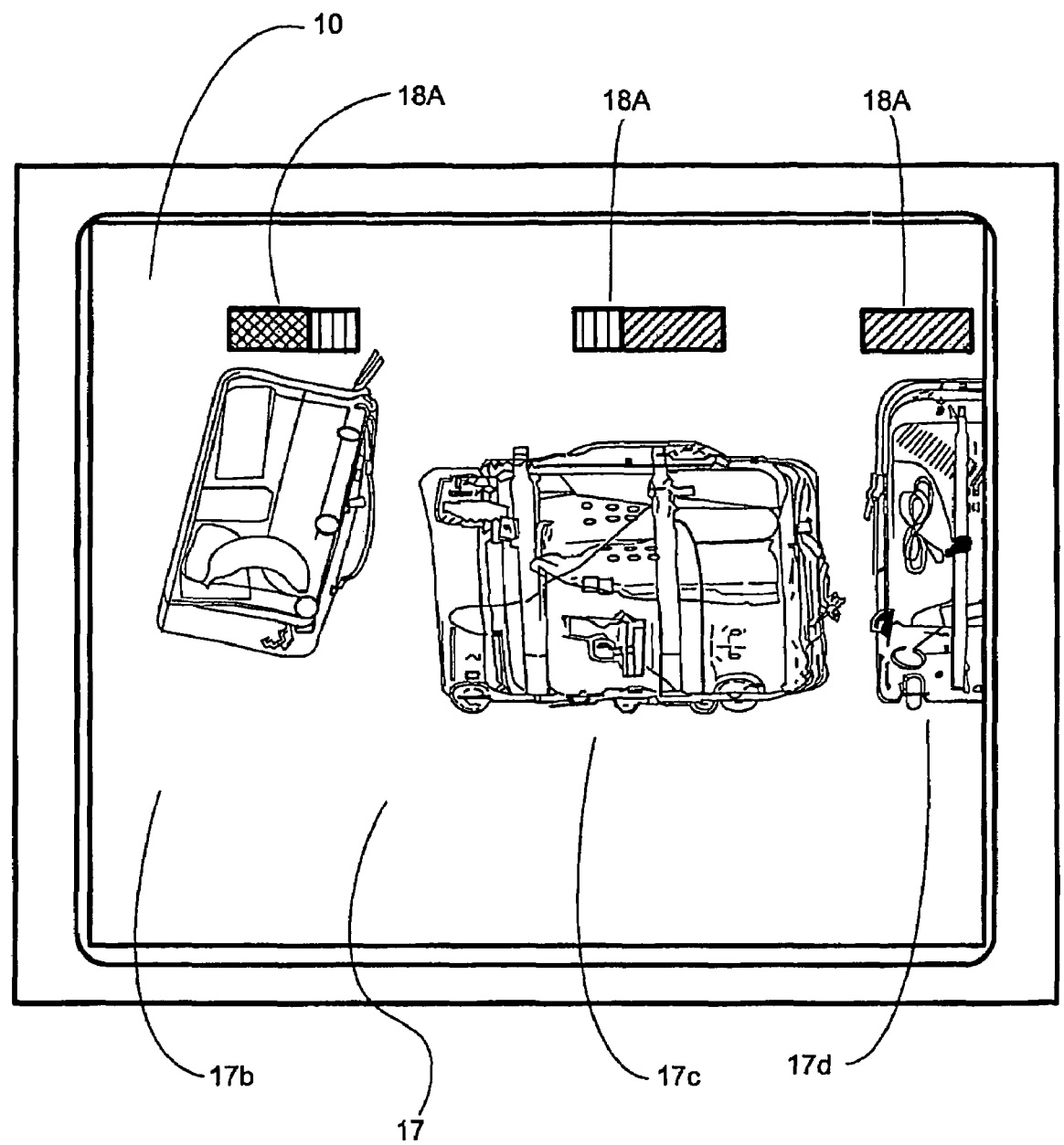
FIG. 4 is a drawing of a monitor screen display illustrating another example of visual feedback of the locations within the scanner system of the articles whose x-ray images are displayed on the monitor screen and whose physical locations within the system are as shown in FIG. 2.

FIG. 4 shows another representation of article location indicators 18A. The shadings of the article location indicators 18A indicate the locations within the system of the articles 4 corresponding to the x-ray images 17 and provide more information than do article location indicators 18 (FIG. 3). For this example articles 4 again are located as shown in FIG. 1 and FIG. 2 and the article location indicators 18A displayed above each x-ray image 17 are shaded to indicate to the screener the region or regions within which the articles 4 are located. In this example, if an article 4 overlaps two regions then the corresponding article location indicator 18a is painted in two colors, patterns, or shades to represent the relative amount of the article 4 within each region. In the example shown in FIG. 4, the article location indicator 18A above x-ray image 17b is partially lightly shaded and partially darkly shaded showing that article 4b (FIG. 2) corresponding to x-ray image 17b is passing into cleared article access region 13 from article removal region 12 and is, or is becoming, accessible to being retrieved by passengers or other persons in the secure area behind the checkpoint. The article location indicator 18A above x-ray image 17c is partially moderately shaded and partially lightly shaded which shows that article 4c (FIG. 2) corresponding to x-ray image 17c is passing into article removal region 12 from region 11 within the scanner and is inaccessible to being retrieved by passengers or other persons in the secure area behind the checkpoint and is becoming accessible to security personnel for removal through the side opening in article removal region 12. The article location indicator 18A above x-ray image 17d is moderately shaded, which shows that article 4d (FIG. 2) corresponding to x-ray image 17d is located primarily in region 11 within the scanner and is inaccessible to being retrieved by passengers or other persons in the accessible secure area behind the checkpoint and inaccessible to removal by security personnel at article removal region 12.

Figure 5:
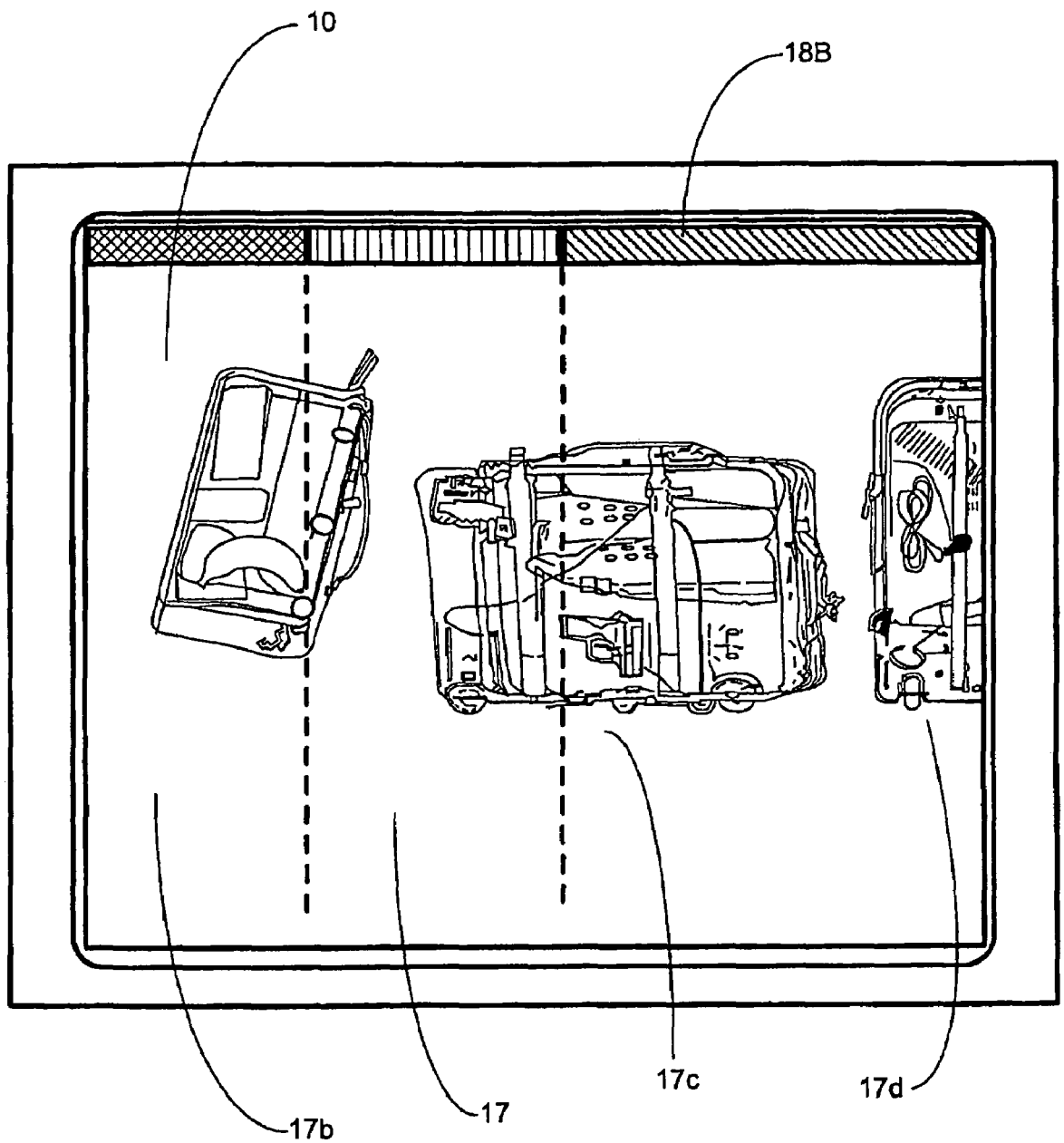
FIG. 5 is a drawing of a monitor screen display illustrating yet another example of visual feedback of the locations within the scanner system of the articles whose x-ray images are displayed on the monitor screen and whose physical locations within the system are as shown in FIG. 2.

FIG. 5 shows yet another representation of article location indicators 18B. In this case the article location indicators 18B are arranged as a strip across a display monitor screen such as display monitor 10. The colors, shades, or patterns on the article location indicator strip 18B indicate locations within the system of the articles 4 corresponding to the x-ray images 17 and provide information similar to article location indicators 18A (FIG. 4) but are perhaps easier read and interpreted. For this example, articles 4 are located as shown in FIG. 1 and FIG. 2 and sections of the article location indicator strip 18B are shaded to indicate the regions (11, 12, or 13 or adjacent combinations thereof) within which articles 4 are located corresponding to the x-ray images 17 above which the article location indicator strip 18B is positioned. Article location indicator strip 18B could also be positioned below x-ray images 17, on x-ray images 17, or other placement. If an article 4 overlaps two regions in this example then the corresponding positions along article location indicator strip 18B are shaded with two shades to represent the relative amount of the article 4 within each region. In the example shown in FIG. 5 the section of article location indicator strip 18B above x-ray image 17b is partially dark shaded and partially light shaded which shows that article 4b (FIG. 2) corresponding to x-ray image 17b is passing into cleared article access region 13 from article removal region 12 and is accessible to being retrieved by persons in the secure area behind the checkpoint. The section of article location indicator strip 18B above x-ray image 17c is partially light shaded and partially moderately shaded which shows that article 4c (FIG. 2) corresponding to x-ray image 17c is passing into article removal region 12 from region 11 within the scanner and is inaccessible to being retrieved by persons in the secure area behind the checkpoint and is becoming accessible to security personnel for removal through the side opening in article removal region 12. The section of article location indicator 18B above x-ray image 17d is moderately shaded which shows that article 4d (FIG. 2) corresponding to x-ray image 17d is located primarily in region 11 within the scanner and is inaccessible to being retrieved by persons in the secure area behind the checkpoint and inaccessible to removal by security personnel at article removal region 12.

Figure 6:
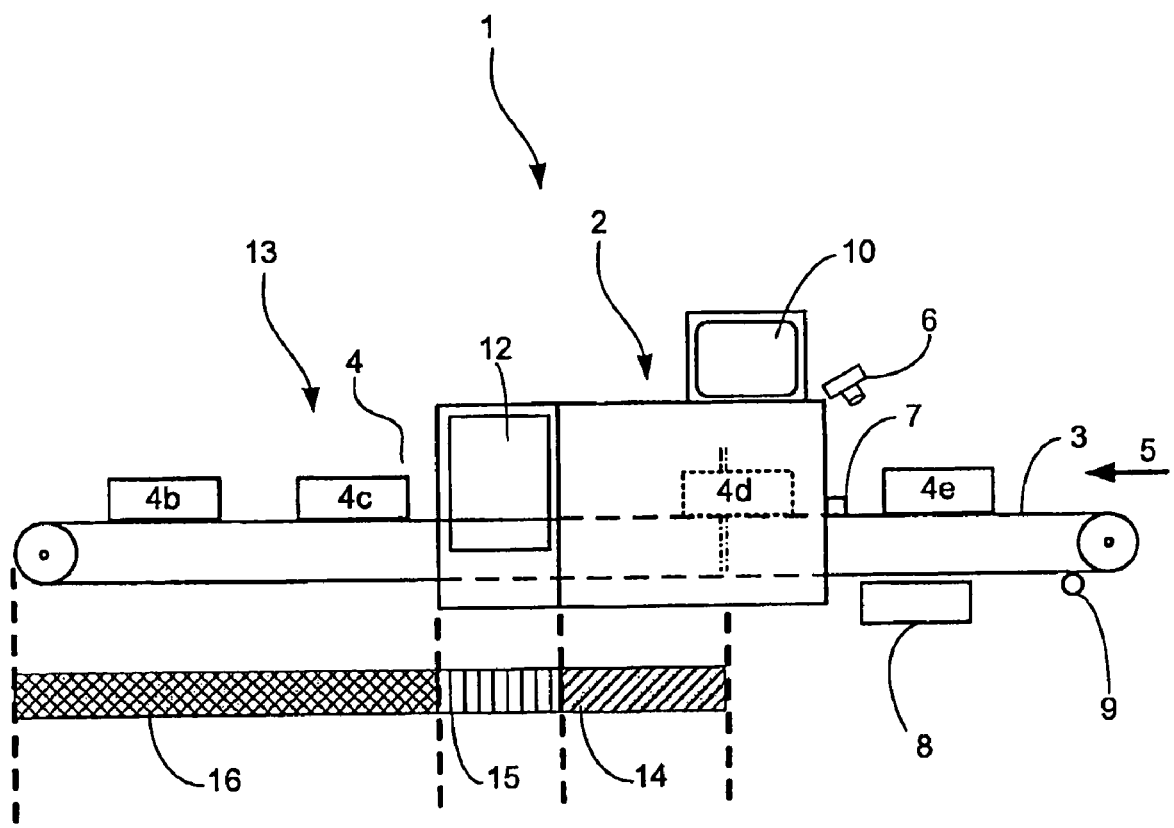
FIG. 6 is a schematic drawing of the scanning system shown in FIG. 2 except with a different distribution in locations of articles flowing through the system.
Figure 7:
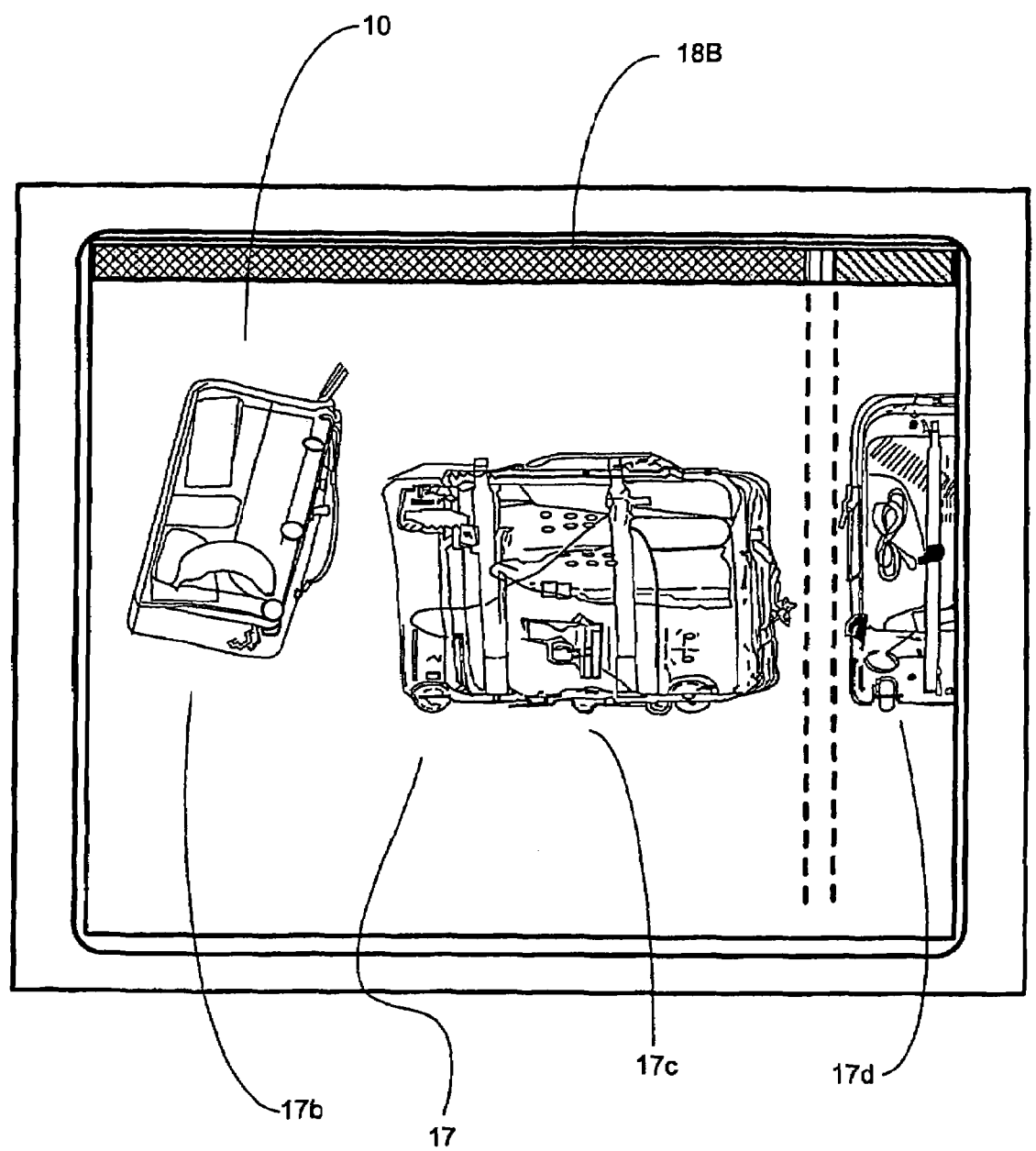
FIG. 7 is a drawing of a monitor screen display similar to that of FIG. 5 illustrating an example of visual feedback of the locations within the scanner system of the articles whose x-ray images are displayed on the monitor screen and whose physical locations within the system are as shown in FIG. 6.

FIG. 6 is similar to FIG. 2 except that articles 4 now occupy different locations within scanner system 1. FIG. 7 shows the appearance of article location indicator strip 18b for article 4 locations as per FIG. 6. In FIG. 7 article location indicator strip 18b visually conveys that article 4b corresponding to x-ray image 17b is located in cleared article access region 13 and is accessible to being retrieved by persons in the secure area behind the checkpoint, as is article 4c corresponding to x-ray image 17c. Article location indicator strip 18b also visually conveys that article 4d, corresponding to x-ray image 17d, has been partially scanned through scan zone 2z and is entering into region 11 within the scanner and so is inaccessible for removal from scanning system 1 at either article removal region 12 or cleared article access region 13.

Figure 8:
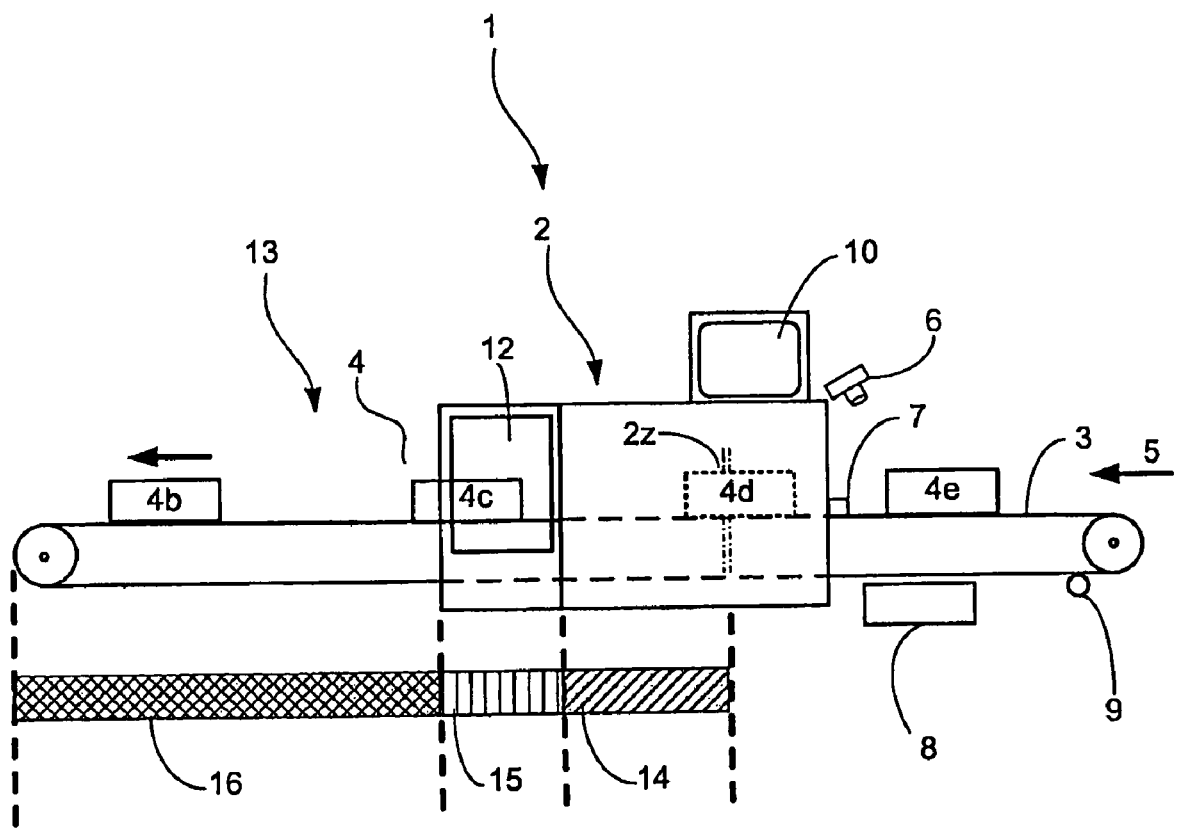
FIG. 8 is a schematic drawing of the scanning system shown in FIG. 2 and FIG. 6 except with yet another distribution in locations of articles flowing through the system.
Figure 9:
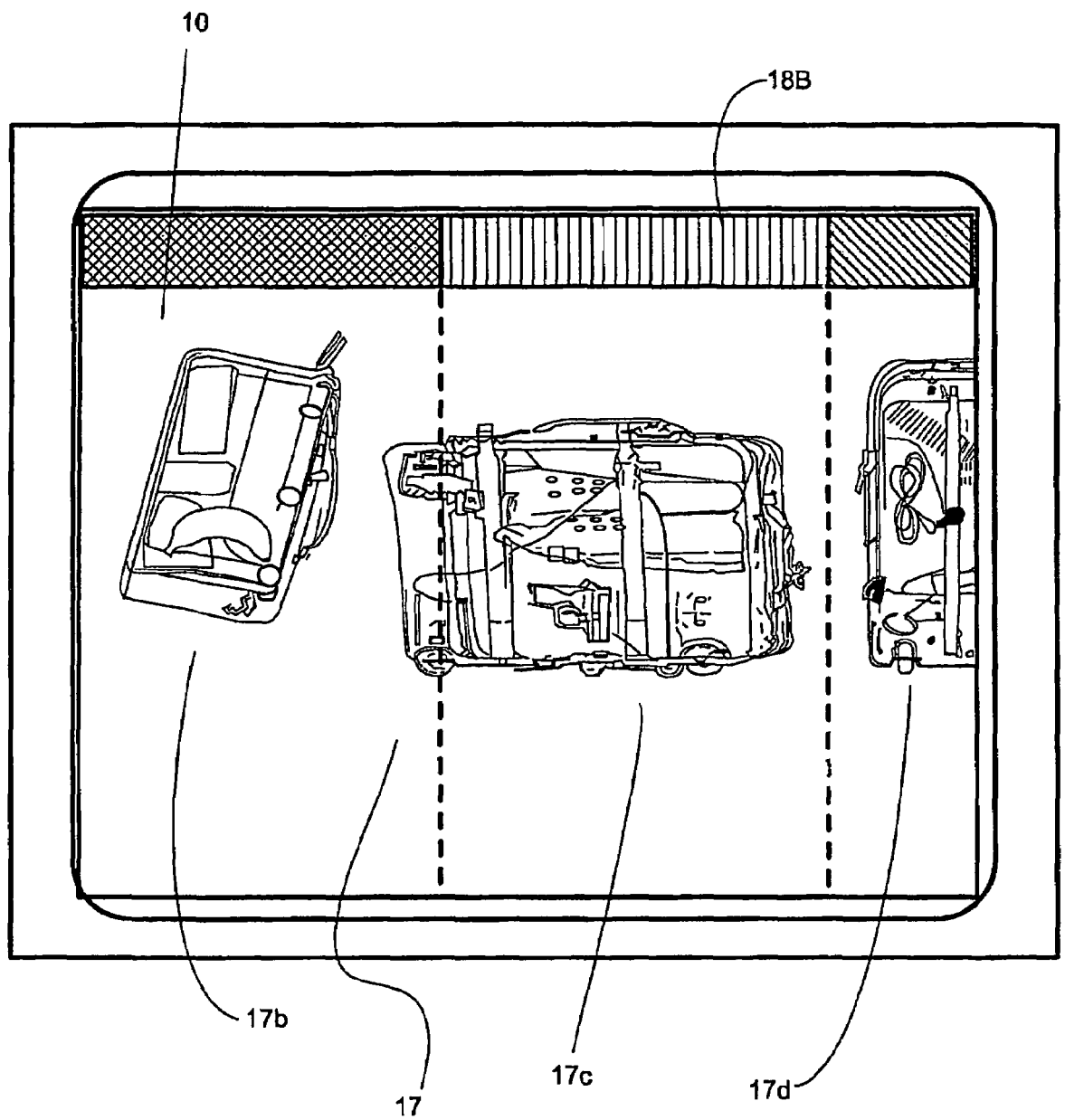
FIG. 9 is a drawing of a monitor screen display similar to that of FIG. 5 and FIG. 7 illustrating an example of visual feedback of the locations within the scanner system of the articles whose x-ray images are displayed on the monitor screen and whose physical locations within the system are as shown in FIG. 8.

FIG. 8 is similar to FIG. 2 and FIG. 6 except that articles 4 occupy different locations within scanner system 1 from the articles 4 shown in FIG. 2 and FIG. 6. FIG. 9 shows the appearance of article location indicator strip 18b for article 4 locations as per FIG. 8. In FIG. 9 article location indicator strip 18b visually conveys that article 4b corresponding to x-ray image 17b is located in cleared article access region 13 and is accessible to being retrieved by persons in the secure area behind the checkpoint. Article 4c corresponding to x-ray image 17c is just exiting article removal region 12 into cleared article access region 13 and is becoming accessible to being retrieved by persons in the secure area behind the checkpoint. Article location indicator strip 18b also visually conveys that article 4d, corresponding to x-ray image 17d, has been partially scanned through scan zone 2z and is entering into region 11 within the scanner and so is inaccessible for removal from scanning system 1 at either article removal region 12 or cleared article access region 13.

FIGS. 2, 6, and 8 show various location of articles 4 within scanning system 1 and FIGS. 5, 7, and 9 show the appearance of location indicator strip 18b for each case. It is instructive to note that the appearance of x-ray images 17 on monitor display screen 10 in FIGS. 5, 7, and 9 is identical for all three cases presented even though the physical locations of articles 4 within scanner system 1 are different for each case. The fact that the display of x-ray images 17 on display monitor 10 can be identical for various distributions of articles 4 within the scanning system 1 is indicative of the need for the present invention to help security personnel in knowing the physical location of articles 4 within scanning system 1.

Figure 10:
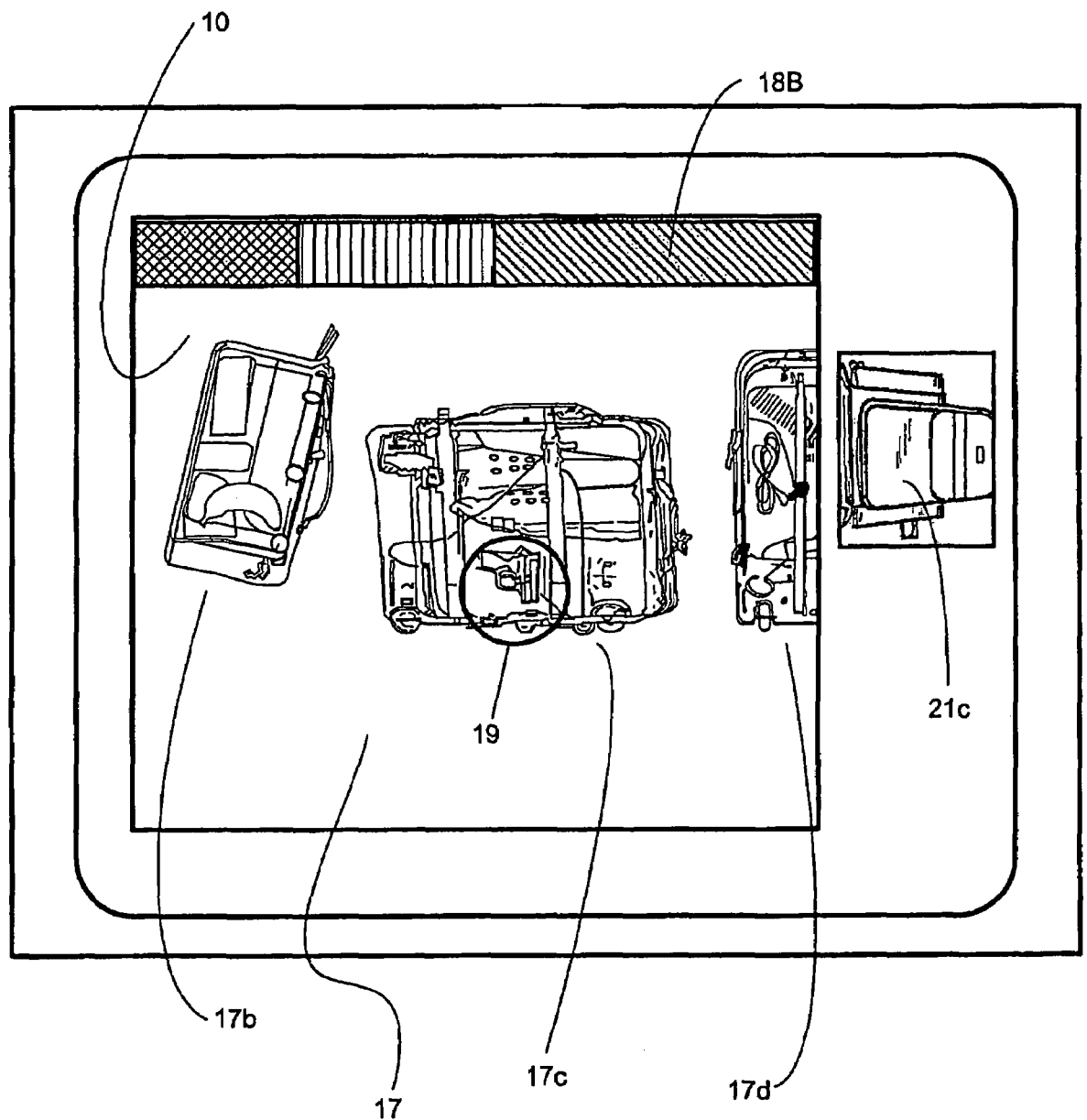
FIG. 10 is a drawing of a monitor screen display illustrating an example of visual feedback of the locations within the scanner system of the articles whose x-ray images are displayed on the monitor screen along with a photograph of one of the articles which has been selected by the screener for searching.

FIG. 10 illustrates another feature of the present invention. In FIG. 10 an article 4 corresponding to x-ray image 17c has been selected by a screener for further inspection or searching as evidenced by Region of Interest (ROI) 19 placed around a suspect item seen in the x-ray image 17c which is the x-ray image of article 4c with articles 4 distributed in scanner system 1 as shown in FIG. 2. In this example the selection of x-ray image 17c and placement of ROI 19 on x-ray image 17c by the screener is performed through use of touch screen interactive selection technology as described in Reissue application Ser. No. 10/252,444 of U.S. Pat. No. 6,124,560 and U.S. Pat. No. 7,012,256 B1, issued Mar. 14, 2006, and as further described in Provisional Application Ser. No. 60/342,290 filed Dec. 21, 2001, Provisional Application Ser. No. 60/501,741 filed Sep. 10, 2003, Provisional Application Ser. No. 60/501,767 filed Sep. 10, 2003, and patent application Ser. No. 10/938,238 filed Sep. 10, 2004, all of which are commonly owned with the present application and all of which are incorporated herein by reference. Software executing in computer 8 utilizes input signals from sensors within scanner system 1 such as conveyor belt position encoder 9 and trigger system 7 and/or other tracking sensors to track articles as they progress through scanner system 1. Computer 8 maintains an association of such articles with photographs taken of the articles, such as by camera 6, as they progress through the system and with their corresponding x-ray images 17. The selection of article 4c by a screener for further inspection or searching, as described above, results in computer 8 displaying corresponding photograph 21c of article 4c on display screen 10 along with its x-ray image 17c and perhaps other x-ray images 17 and article location indicator strip 18b. The visual appearance of article location indicator strip 18b shows that article 4c (FIG. 2) corresponding to x-ray image 17c is passing from region 11 within the scanner into article removal region 12 and is inaccessible to being retrieved by persons in the secure area behind the checkpoint and is becoming accessible to security personnel for removal through the side opening in article removal region 12. Photograph 21c of article 4c shows the visual appearance of article 4c. The screener therefore knows where article 4c is located in scanner system 1 and the visual appearance of article 4c, which helps in finding and removing article 4c from scanner system 1 in order to search article 4c for the suspect item marked with ROI 19 by the screener on x-ray image 17c.

Figure 11:
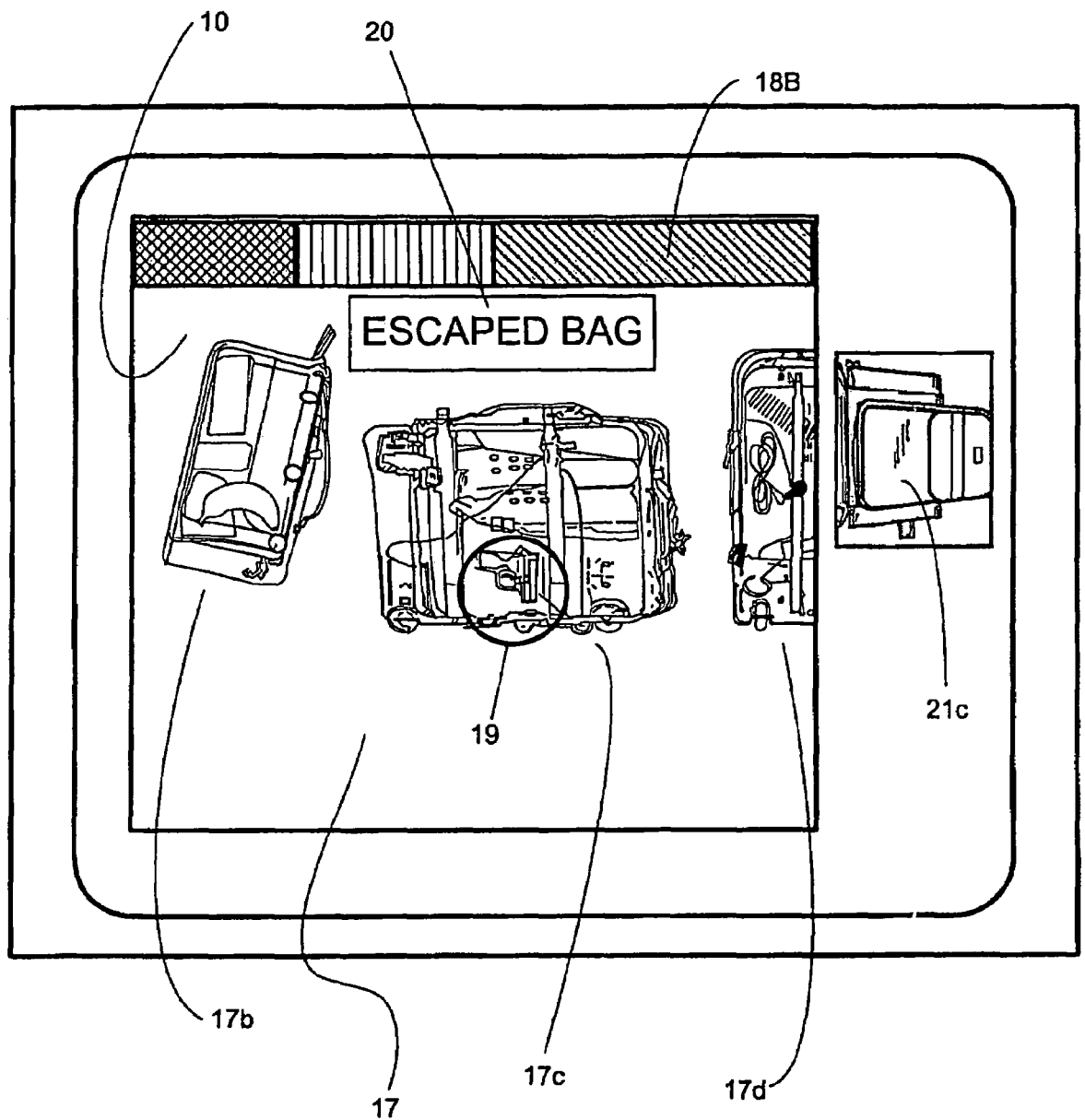
FIG. 11 is a drawing of a monitor screen display illustrating an example of visual feedback of the locations within the scanner system of the articles whose x-ray images are displayed on the monitor screen along with a photograph of one of the articles which has been selected by the screener for searching and showing a temporary notification to stop the motion of the conveyor belt.

FIG. 11 illustrates another feature of the present invention. In the event that a screener selects an article for further inspection or search, such as through interactive selection as discussed above or by other means, it is desired that the selected article 4 not pass into cleared article access region 13. Upon selection of an article 4 for further inspection or search, software running in computer 8 registers such selection and through signals received from encoder 9 or other such sensors tracks article 4 physical locations and the motion of conveyor 3. If conveyor 3 is in motion or if selected article 4 is moving into cleared article access region 13 then a notification, such as notification 20, is displayed on display screen 10 to inform security personnel that article 4 is in danger of moving into cleared article access region 13 before inspection of article 4 is completed. In the example shown notification 20 is displayed in the form of the words ESCAPED BAG, denoting that article 4 is in danger of "escaping" into cleared article access region 13 before inspection is completed, although other forms of notification could be used and remain within the scope and spirit of the present invention. Notification 20 can be momentary or can be discontinued when the motion of coriveyor 3 is stopped. Additionally other alerts can be used such as a flashing red light, an audible alarm, or other to alert security personnel to the imminent security breach caused by escape of article 4 into cleared article access region 13 before inspection is completed.

Figure 12:
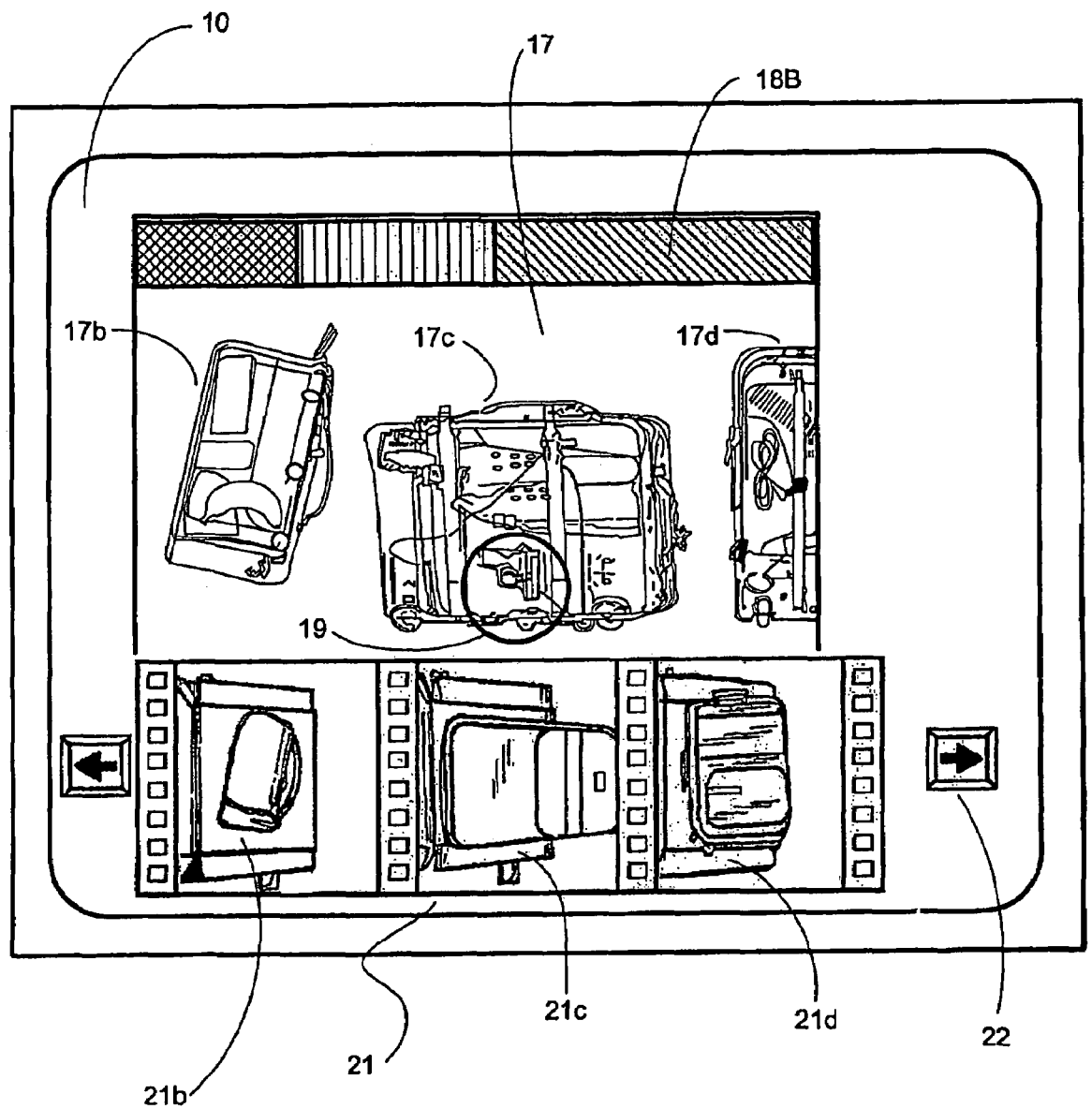
FIG. 12 is a drawing of a monitor screen display illustrating an example of visual feedback of the locations within the scanner system of the articles whose x-ray images are displayed on the monitor screen along with photographs of the articles whose x-ray images are displayed on the monitor screen and a visual indication of a suspect item within an x-ray image which has been selected by the screener.

FIG. 12 illustrates a further feature of the present invention. In FIG. 12 is shown a series of photographs 21 of articles 4 along with x-ray images 17 of articles 4, article location indicator strip 18b, and ROI 19. The photographs 21b, 21c, and 21d (of articles 4b, 4c, and 4d) presented correspond to x-ray images 17b, 17c, and 17d respectively as determined by the computerized article tracking features of the system. It is advantageous to arrange the photographs 21 in the order (in this example left to right) in which they were acquired with camera 6 and position the series of photographs 21 so that they can be conveniently compared to their corresponding x-ray images 17. Comparison of photographs 21 of articles 4 with x-ray images 17 of articles 4 can help verify the computerized match of articles 4 to their x-ray images 17 and assist in resolving ambiguities as can occur, for instance, in cases of overlapping articles 4 or articles 4 slipping on the conveyor belt surface thereby confusing computer 8 in its making computerized matches of photographs of articles 4 with x-ray images 17. Security personnel such as the screener can compare relative sizes, shapes, orientations, and visible features between photographs of articles 4 with x-ray images 17 in order to resolve ambiguities and verify matches. It is also provided in the present invention that the series of photographs 21 can be scrollable, in this example to the right or to the left, using scroll controls 22 or similar to view photographs of other articles 4 ahead of or behind the articles 4 whose photographs are displayed. The series of photographs 21 also may be advantageously displayed on another monitor or monitors.

Figure 13:
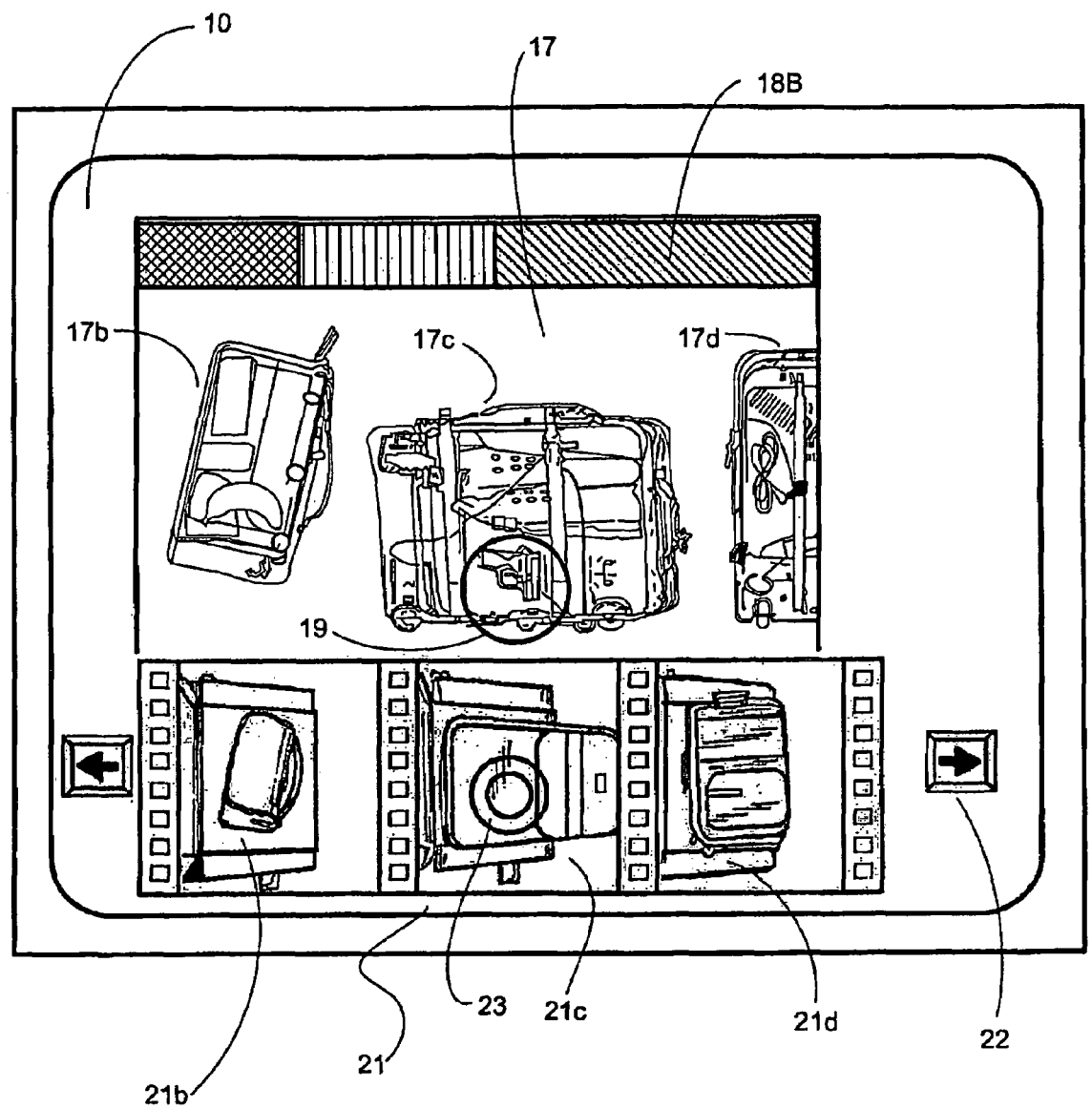
FIG. 13 is a drawing of a monitor screen display illustrating an example of visual feedback of the locations within the scanner system of the articles whose x-ray images are displayed on the monitor screen along with photographs of the articles whose x-ray images are displayed on the monitor screen, a visual indication of a suspect item within an x-ray image which has been selected by the screener, and a visual indication of approximate location of the suspect item on the photograph of the article corresponding to the x-ray image having the suspect item selected by the screener.

FIG. 13 illustrates yet another feature of the present invention. In the illustration article 4c corresponding to x-ray image 17c has been interactively selected by a screener for further inspection or search as evidenced by ROI 19. Computer system 8, having registered the screener's interactive selection, places ROI 23 on photograph 21c of article 4c corresponding to x-ray image 17c thereby visually marking photograph 21c as being the photograph of the article 4c which has been selected for further inspection or search. Such visible marking with ROI 23 is intended to help the screener and other security personnel in determining the correct photograph of article 4c to assist in finding and gaining custody of article 4c to carry out further inspection or search and in some cases an indication of where to look within the article 4c. The screener may remove ROI 23 or move ROI 23 to another photograph upon resolving ambiguities as can occur, for instance, in cases of overlapping articles 4 or articles 4 slipping on the conveyor belt surface thereby confusing computer 8 in its making computerized matches of photographs of articles 4 with x-ray images 17.

Figure 14:
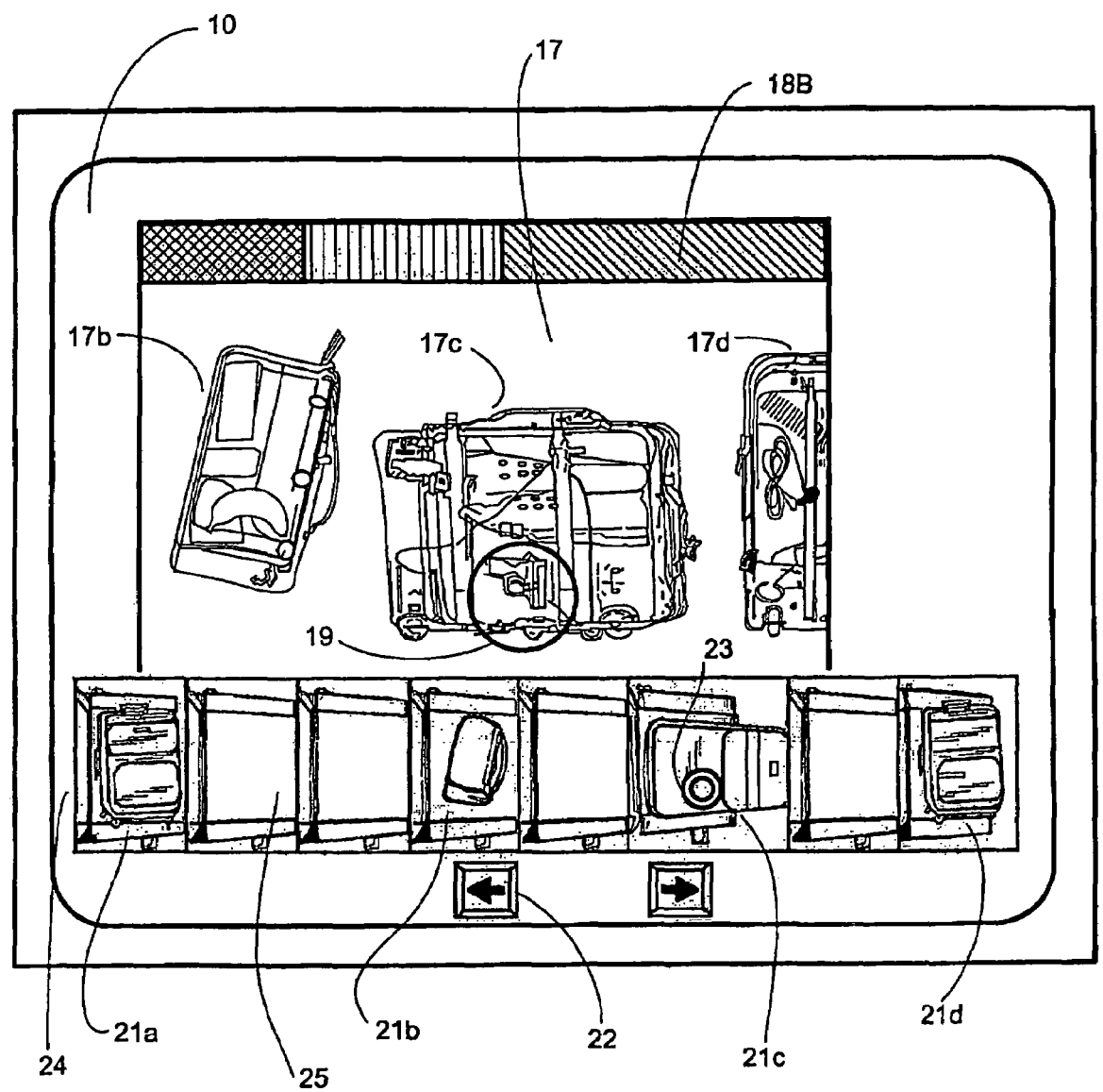
FIG. 14 is an additional drawing of a monitor screen display illustrating an example of visual feedback of the locations within the scanner system of the articles whose x-ray images are displayed on the monitor screen along with the photographs or video of articles whose x-ray images are displayed on the monitor screen along with photographs of empty belt between the articles representative of the actual spacing between the articles as they flow through the scanner system, a visual indication of a suspect item within an x-ray image which has been selected by the screener, and a visual indication of approximate location of the suspect item on the photograph of the article corresponding to the x-ray image having the suspect item selected by the screener.

FIG. 14 shows yet another presentation of photographs of articles 4. In this presentation a series of photographs 24 are arrayed in a strip across display screen 10 and include photographs of empty space 25 on conveyor belt 3. Photographs 21a, 21b, 21c, 21d corresponding to articles 4a, 4b, 4c, and 4d are shown with photographs of empty belt between them representative of the actual spacing between articles 4a, 4b, 4c, and 4d measured by computer 8 as they pass through scanner system 1. Such a photographic display of articles 4 flow through scanning system 1 can be useful to security personnel in tracking the flow of articles 4 flow through scanning system 1 and in locating and maintaining control of articles 4 as they move through scanning system 1. ROI 23 may, if desired, be presented by computer 8 on photograph 21c, preferably at the approximate location of a suspect item within the article 4c as registered for instance through a touch screen by the screener on corresponding x-ray image 17c as indicated by ROI 19, indicating that corresponding article 4c has been selected for further inspection or search. The strip of photographs 24 across display screen 10 may be scrollable through scroll controls 22 or similar. The screener or other viewer may remove ROI 23 or move ROI 23 to another photograph upon resolving ambiguities as can occur, for instance, in cases of overlapping articles 4 or articles 4 slipping on the conveyor belt surface thereby confusing computer 8 in its making computerized matches of photographs of articles 4 with x-ray images 17. The series of photographs 24 also may be advantageously displayed on another monitor or monitors for instance to assist security personnel in keeping track of articles 4 as they move through scanning system 1.

Figure 15:
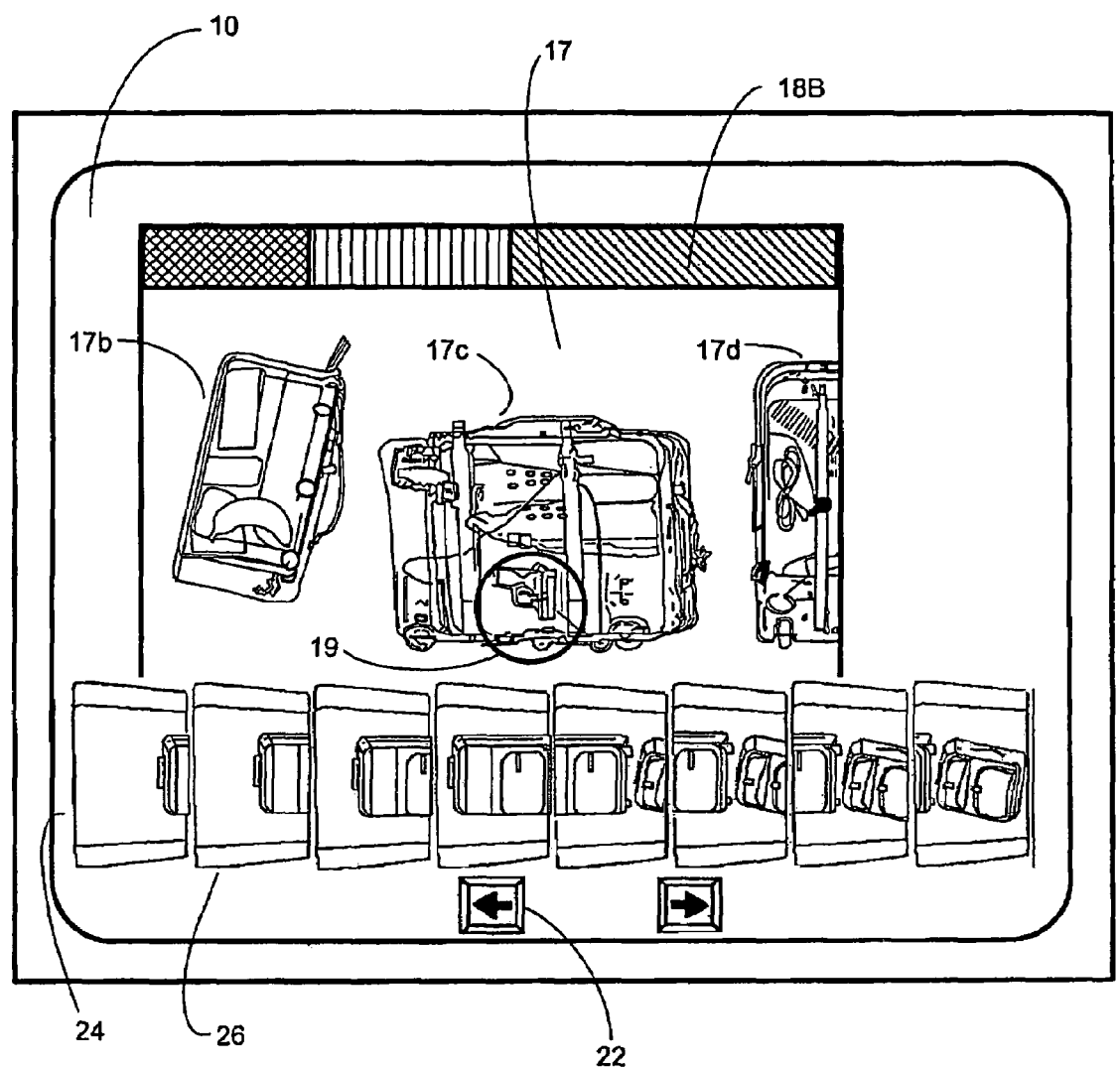
FIG. 15 is a drawing of a monitor screen display illustrating an example of visual feedback of the locations within the scanner system of the articles whose x-ray images are displayed on the monitor screen along with a scrollable series of photographs or scrollable video of an article whose x-ray image is displayed on the monitor screen, the series showing incremental advancement of the article as it advances into or through the scanner system.
Figure 16:
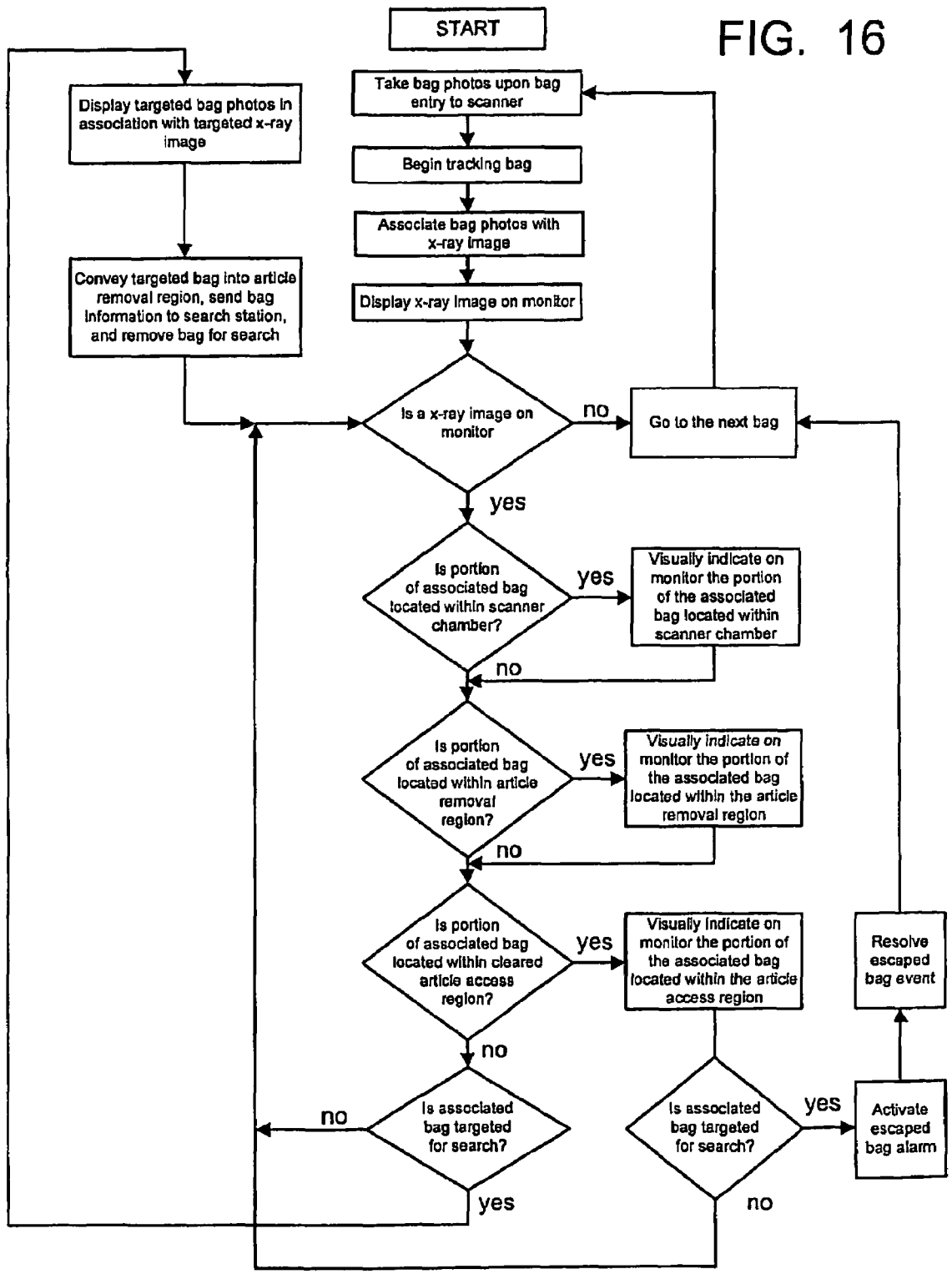
FIG. 16 is a flowchart of the process used to track the position of an article within the system.

FIG. 15 shows another presentation of a series of photographs of articles 4 arrayed in a strip 24 across display screen 10. In this presentation successive photographs 26 show an incremental advancement (for instance 6 inches) of articles 4 on conveyor belt 3 so that the advancement can be viewed which can aid in correlating photographs 26 with the displayed x-ray images 17 and the article location indicator strip 18b. The strip of photographs 24 across display screen 10 may be scrollable through scroll controls 22 or similar. The series of photographs 24 also may be advantageously displayed on another monitor or monitors for instance to assist security personnel in keeping track of articles 4 as they move through scanning system 1. Other such presentations of photographs of articles 4 may be presented on display screen 10 and/or on another monitor or monitors in any of numerous possible formats and remain within the scope and spirit of the present invention.

Other embodiments of the invention will be apparent to those skilled in the art from consideration of the specification and practice of the invention disclosed herein. It is intended that the specification be considered as exemplary only, with the true scope and spirit of the invention being indicated by the following claims.

We claim:

1. A method for individually screening and tracking an article in a series of articles using a screening apparatus that includes at least three distinct regions: a scanning region; an article removal region; and a cleared article access region, comprising the steps of:

conveying said article through said screening apparatus;
   tracking the location of said article as said article is conveyed through said screening apparatus;
   scanning said article to create an interior image of said article that reveals any objects contained within said article;
   displaying the interior image of said article at an inspection station for visual inspection by a human operator;
   simultaneously displaying a visual representation of the location of said article in said screening apparatus at said inspection station;

continually updating said visual representation of the location of said article within the screening apparatus as said article progresses through the screening apparatus.

2. The method of claim 1 further comprising the steps of:
visually inspecting, by said operator, said interior image of said article for objects requiring examination at said inspection station and
deciding, by said operator,
to require said article to be removed from the article removal region of the screening apparatus and transported to an examination area for examination or
to allow said article to be released into the cleared article access region without further inspection.

3. The method of claim 2 further comprising the steps of:
selecting, by said operator, a region-of-interest for examination on the interior image of said article and
highlighting, by said operator, said region-of-interest on the interior image of said article being displayed in said inspection station.

4. The method of claim 3 further comprising the steps of:
digitally capturing an exterior image of said article before said article is scanned and
associating the exterior image of said article with the interior image of said article.

5. The method of claim 4 further comprising the step of:
displaying the exterior image of said article simultaneously with the interior image of said article and the visual representation of the location of said article.

6. The method of claim 5 further comprising the step of:
highlighting said region-of-interest on the exterior image of said article.

7. The method of claim 4 further comprising the steps of:
transporting an article selected for examination from the article removal region to the examination area and
displaying the interior image of said article and the exterior image of said article selected for examination in the examination area.

8. The method of claim 7 further comprising the step of:
highlighting the region-of-interest on the exterior image of said article and on the interior image of said article being displayed in the examination station.

9. The method of claim 7 further comprising the step of:
displaying a visual representation of the location of said article selected for examination in the examination area.

10. The method of claim 2 further comprising the step of:
triggering an alarm if said article enters said cleared article access region before said step of deciding whether said article should be selected for examination has occurred.

11. The method of claim 10 further comprising the step of:
triggering an alarm if said article enters said cleared article access region after said article has been selected for examination.

12. The method of claim 2 further comprising the steps of:
triggering an alarm if said article enters said cleared article access region before said step of deciding whether said article should be selected for examination has occurred and
triggering an alarm if said article enters said cleared article access region after said article has been selected for examination.

13. The method of claim 2 wherein the step of inspecting occurs at a location remote from the location where the scanning step occurs.

14. The method of claim 2 further comprising the step of positioning an article selected for further examination at the article removal region of the screening apparatus using the displayed visual representation of the article's location within the scanning apparatus.

15. The method of claim 14 wherein the inspection station is located remotely from the scanning apparatus.

16. The method of claim 1 wherein said step of continually updating the visual representation of the location of said article terminates when the step of displaying the interior image of said article terminates.

17. A system for individually screening and tracking the location of each article in a series of discrete articles comprising:
a scanning apparatus including:
means for transporting said articles;
a scanning region;
an article removal region; and
a cleared article access region;
means for tracking the physical position of an article within said scanning apparatus;
an X-ray scanner;
means for creating an interior image of said article revealing any discrete objects contained within said article; and
an inspection station, said inspection station including
means for simultaneously displaying the interior image of said article and a continually updating indicator of the location of said article within said scanning apparatus in said inspection station;
means for selecting a discrete object within said article for examination by a human operator; and
means for clearing an article to be conveyed to said cleared article access region by a human operator if no objects within said article were selected for examination.

18. The system of claim 17 further comprising
an alarm, said alarm being activated if an article enters said cleared article access region before being cleared for such entry.

19. The system of claim 17 further comprising:
means for capturing an exterior image of said article before said article is scanned and
means for associating said exterior image with said interior image.

20. The system of claim 19 further comprising:
means for simultaneously displaying the interior image of said article, the exterior image of said article, and the location of said article in said inspection station.

21. The system of claim 19 further comprising
an examination station and
means for displaying the interior image of an article selected for examination in said examination station.

22. The system of claim 21 further comprising means for simultaneously displaying the interior image of the article and the exterior image of the article in said examination station.

23. The system of claim 17 wherein the inspection station is located remotely from the scanning apparatus.

24. A system for individually screening and tracking the location of an article in a series of discrete articles comprising:
a scanning apparatus including:
a conveyor for transporting said articles, said conveyor having a continuous belt;
a scanning region;
an article removal region; and
a cleared article access region;

a belt position sensor, said belt position sensor being capable of sending a signal indicating the position of said belt and being capable of electronic communication with a computer;

a photoelectric sensor, said photoelectric sensor being capable of sending a signal when said photoelectric sensor's beam is interrupted by said article and being capable of electronic communication with said computer;

an X-ray scanner, said X-ray scanner being capable of electronic communication with said computer; and an inspection station, said inspection station including a monitor and a means for selecting a discrete object within said article for further review by a human operator and a means for clearing said article by a human operator, wherein said computer includes means for
  determining and tracking the location of said article based on signals from said photoelectric sensor and said belt position sensor;
  generating an X-ray image of said article based on the data from said X-ray scanner; and
  simultaneously displaying said X-ray image and a continually updating indicator of the location of said article within said screening apparatus on said monitor in said inspection station.

25. The system of claim 24 further comprising
an alarm, said alarm being activated by said computer if an article enters said cleared article access region before being cleared for such entry.

26. The system of claim 25 further comprising:
a digital camera, said camera being capable of capturing an exterior image of said article before said article is scanned and said camera being capable of electronically transmitting said exterior image to said computer wherein said computer is capable of associating the exterior image of said article and the X-ray image of said article with the location of said article.

27. The system of claim 26 wherein said computer is further capable of simultaneously displaying the X-ray image of said article, the exterior image of said article, and the location of said article on said monitor in said inspection station.

28. The system of claim 27 further comprising
an examination station, said examination station including a monitor, and
wherein said computer is further capable of simultaneously displaying the X-ray image of said article, the exterior image of said article, and the location of said article on said monitor in said examination station.

29. The system of claim 24 wherein the inspection station is located remotely from the scanning apparatus.

* * * * *